United States Patent [19]

Welborn

[11] Patent Number: 5,162,021
[45] Date of Patent: Nov. 10, 1992

[54] SEPARATOR OUTLET MEMBER FOR A PEA SHELLER

[76] Inventor: Woodrow W. Welborn, Rte. 12, Box 400, Laurel, Miss. 39440

[21] Appl. No.: 727,179

[22] Filed: Jul. 9, 1991

[51] Int. Cl.⁵ .............................................. A01F 12/44
[52] U.S. Cl. .................................... 460/131; 460/141
[58] Field of Search ............... 460/131, 132, 133, 123, 460/141, 142; 209/288, 296, 299

[56] References Cited

U.S. PATENT DOCUMENTS

| | | |
|---|---|---|
| 854,443 | 5/1907 | Voorhees . |
| 2,325,509 | 7/1943 | Hastwell ...................... 460/132 X |
| 4,024,877 | 5/1977 | Welborn . |
| 4,597,977 | 7/1986 | Brown ........................... 460/142 X |

*Primary Examiner*—Terry Lee Melius
*Attorney, Agent, or Firm*—Edwin E. Greigg; Ronald E. Greigg

[57] ABSTRACT

An improved separator outlet member for a pea sheller which includes a plurality of square passageways aligned side-by-side along the length of a base member. The peas are collected in the square openings as the pea sheller rotates and the peas drop onto a bottom plate spaced from the passageways from which the peas pass to a shaker for collection.

14 Claims, 1 Drawing Sheet

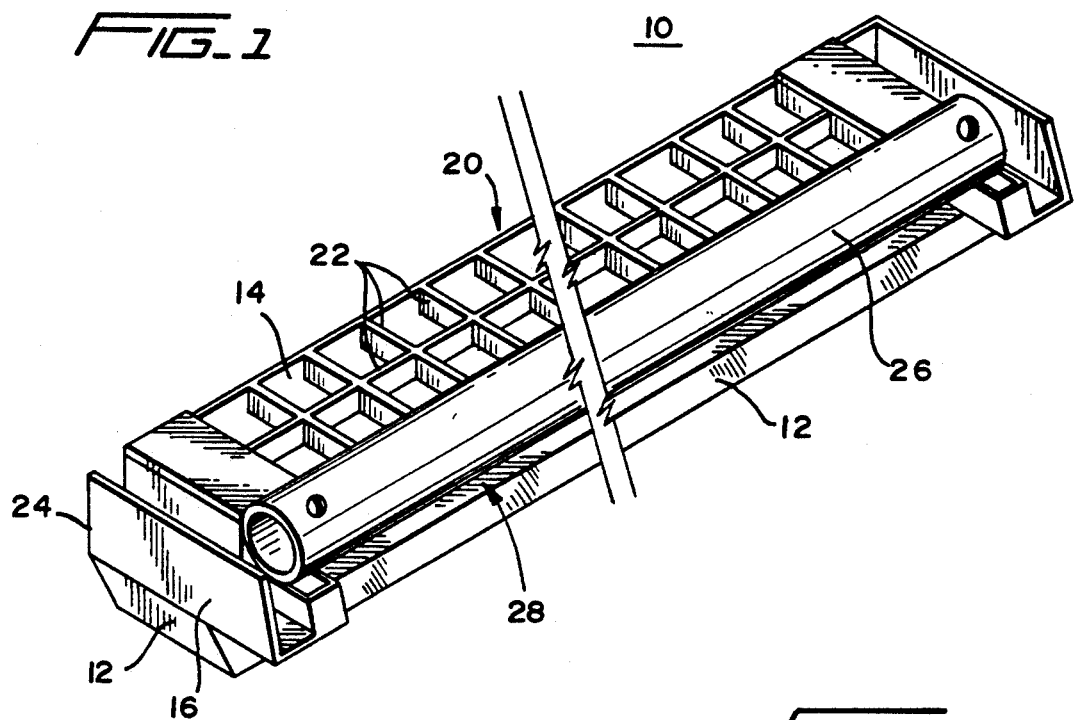
FIG_1
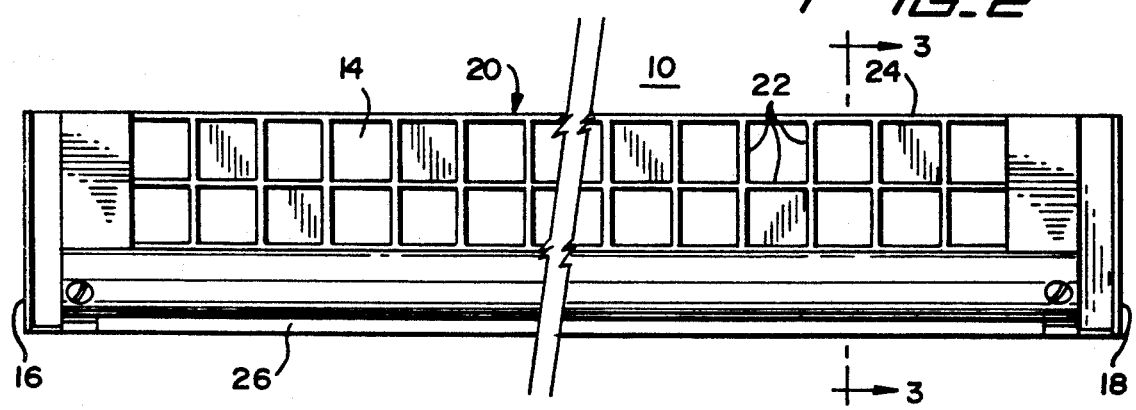
FIG_2
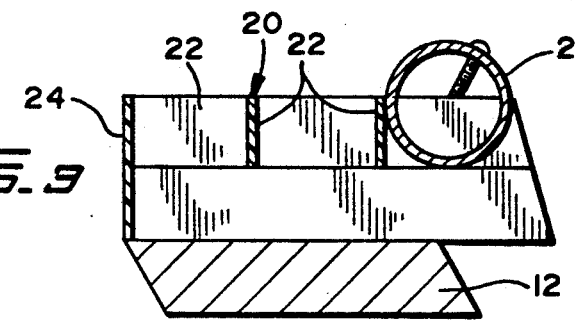
FIG_3

SEPARATOR OUTLET MEMBER FOR A PEA SHELLER

BACKGROUND

This invention is directed to a vegetable pea sheller and more particularly to an improved separator outlet member through which the peas exit from the pea sheller after being shelled.

This improved pea sheller separator outlet member is adapted to be substituted for the outlet member used in the pea sheller device set forth in applicant's prior U.S. Pat. No. 4,024,877 which patent is incorporated herein by reference. In addition to the prior art cited in the above patent the following patent is of interest, namely, U.S. Pat. No. 854,443.

U.S. Pat. No. 854,443 shows a grain assorter having a rotary drumhead provided with crimped plates forming a trough shape, which when assembled about the periphery of the drumhead form assorting pockets. This structure establishes a tortuous path for the material to be sorted and will cause clogging. In addition, while susceptible of sorting various sizes of kernel, e.g., corn, the device is not designed to shell vegetables which grow in pod-like formations, such as peas, by separating the pod from the pea.

In operation of the known pea sheller, the peas ar picked from the field and placed into the drum of the pea sheller, the outer periphery of which is formed by the separator outlet members. The opening to the drum of the pea sheller is closed and the drum is rotated at a rate of about 25 rpm. The drum includes agitator elements therein which are rotated at about 430 rpm to assist in separating the peas from the shell as the shells with the peas therein drop onto the agitator elements and the drum and agitator are rotated. The separator outlet members of the patented device are made with a plurality of ¾ inch round elbow-shaped openings aligned along the length of the separator outlet member through which the peas are to pass to the outside of the drum to then fall onto a shaker for collection. The known sheller separator outlet member having the ¾ inch elbow shaped openings tend to become clogged at times and require considerable time for the peas to exit from the drum. Therefore, the known sheller does not operate with a high efficiency.

OBJECT AND SUMMARY OF THE INVENTION

It is therefore a principal object of the invention to provide separator outlet members provided with a greater number of outlet openings and through which the peas to follow a less tortuous path in order to exit from the drum.

Another object of the invention is to provide a structure which does not become clogged with peas allowing the sheller to operate at a much higher efficiency and to separate the peas from the shells much faster.

Still another object of the invention is to provide a pea separator outlet member which provides a much greater outlet area through which the peas pass to the outside of the sheller drum.

The above and other objects, features and advantages of the present invention will be better understood by an understanding of the following detailed description of the invention when considered in conjunction with the accompanying drawings, in which:

BRIEF DESCRIPTION OF THE DRAWINGS

FIG. 1 is a partial perspective view of the improved separator outlet member;

FIG. 2 is a partial top view; and

FIG. 3 is a cross sectional view along lines 3—3 of FIG. 2.

DETAILED DESCRIPTION

Now referring to the drawings, there is shown in FIG. 1 a partial perspective view in which the separator outlet member 10 has been cut across the member to shorten the drawing as shown. The separator outlet member includes a solid piece which forms the bottom or outer piece 12 which may be made of wood or any other suitable material. The bottom piece 12 is shown with the linear edges beveled toward each other the purpose for which will be explained in greater detail below. The passageways 14 in which the peas ar gathered and through which they pass to the bottom piece and the end pieces 16, 18 are formed of plastic as a single piece 20. The single piece 20 of molded or otherwise formed plastic is made with a grid of equi-sized square apertures or passageways 14, including ribs or walls 22 defining openings ¾ inch square. The back member 24 of the single piece 20 is deeper than the passageways 14 to form with the bottom a closed backing. As shown, the passageways 14 only extend downward to about one-half the depth of the back member 24. Therefore, an unobstructed outlet opening 28 is formed along the length of the separator and of a depth equal to the depth of the back member 24 which is greater than that of the passageways. The end pieces 16 and 18 are configured in a U-shape and are adapted to be connected to the end closure of the drumhead, not shown, of a pea sheller as set forth in U.S. Pat. No. 4,024,B77. The front end of the separator outlet member 10 is provided with a tubular member 26 which extends above the plastic piece 20 and acts as a bumper to assist in directing the shelled peas into the passageways 14. The back member 24 and the tubular member 26 on the front are so identified as front and back for clarity in understanding the drawing since either member could be considered the front or back.

The separator outlet member 10 is only one of many such members which are assembled side-by-side around end closures with the bottom piece 12 to the outside to form a drum with the separator outlet members forming the outer bounds of the drum. The separator outlet members are assembled in the same order as the elbow-shaped passageway members of the U.S. Pat. No. 4,024,877. When assembled, the front ends of the end pieces 16 ar assembled along the back side 24 of an adjacent separator outlet member 10. In order to form a cylindrical drum, the edges of the bottom or base are beveled and the front ends of the end pieces 16, 18 are sloped upwardly and toward the back so that the assembled members form a circle about the end closure of the drum.

For illustrative purposes, the end pieces 16, 18, the back 24 and the passages 14 are all formed as one piece which may be molded plastic or any other desired material, as shown. In the preferred embodiment, the back member 24 and the end pieces 16 are one inch deep; the apertures 14 are ½ inch deep with a square opening of ¾ inch; the ribs forming the apertures and the backside have a thickness of ⅛ inch; thus the overall width of the apertures, back members, and end ribs is about 1 7/8 inches. The tube 26 along the length of the front edge is about 7/8 inch in diameter with a length of about 1 foot and 11 inches, and the bottom plate is formed from a piece of material having a width of about 2 ⅝ inches with front and rear 45° beveled edges. The overall length of the bottom piece and the plastic separator outlet member including the ends 16, 18 is about 2 feet. With the dimensions given above, a drum with 2500 square ⅜ inch passageways can be formed with fifty such separator outlet members 10. The end members are formed with a ½ inch slot by which the separator outlet member is secured to the end closure of the drum; therefore the tube 26 would have a length one inch shorter than the plastic separator outlet member.

For a disclosure of the remaining elements in a known pea sheller, and for the operation thereof, applicant refers the reader to his prior U.S. Pat. No. 4,024,877. The only difference between this invention and U.S. Pat. No. 4,024,877 is the new improved separator outlet member which has two rows of side-by-side passageways through which the peas may pass more efficiently and a continuous ½ inch deep opening along the length and below the passageways through which the peas are discharged.

As defined by this structure, the improved pea sheller when in operation produces an as-tested 142% increase in throughput of shelled peas per unit time, thus demonstrating its effectiveness over the known pea sheller.

It should be clear to one skilled in the art that the device can be used for other purposes than shelling peas and that the dimensions set out for the various parts can be changed without departing from the spirit of the invention. Further any suitable materials may be used for the various parts of the separator outlet member.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent:

1. An improved separator outlet member for a pea sheller comprising:
   an elongated, outer base member (12), an elongated outlet member (20) having a backing portion (24) provided with at least two rows of side-by-side parallel passages (14) which passages are perpendicular to said outer base member (12) through which shelled peas drop onto said outer base member,
   said backing member having a greater depth than said side-by-side outlet spacing between said passageways (14) and said outer base member to form a continuous unobstructed outlet through which the peas exit, and
   end members (16, 18) disposed outwardly of said side-by-side passageways and which are secured to said outer base member to secure said improved separator outlet member to end closure members of said pea sheller.

2. An improved separator outlet member as set forth in claim 1, wherein said elongated outlet member and said end members are formed as on integral piece.

3. An improved separator outlet member as set forth in claim 2, in which said elongated outlet member has two rows of side-by-side passages, and said backing portion, said side-by-side passages, and said end members are all formed of one integral piece of material.

4. An improved separator outlet member as set forth in claim 1, in which said elongated outer base member has beveled edges along its length which aids in assembly of a plurality of side-by-side separator outlet members to form a substantially cylindrical outer surface of a pea sheller drum.

5. An improved separator outlet member as set forth in claim 2, which includes a tubular member 26 across the length of said side-by-side passageways with a portion of said tubular member extending above said side-by-side passageways which functions as a bumper to assist in forcing the shelled peas into the side-by-side passageways.

6. An improved separator outlet member as set forth in claim 3, in which a tubular member 26 is disposed across the length of said side-by-side passageways with a portion of said tubular member extending above said side-by-side passageways to function as a bumper to assist in forcing the shelled peas into the side-by-side passageways.

7. A pea sheller as set forth in claim 4, in which a tubular member 26 is disposed across the length of said side-by-side passageways with a portion of said tubular member extending above said side-by-side passageways to function as a bumper to assist in forcing the shelled peas into the side-by-side passageways.

8. An improved separator outlet member for a pea sheller comprising:
   an elongated, outer base member (12), an elongated outlet member (20) having a backing portion (24) provided with at least two rows of side-by-side passage ways (14) through which shelled peas drop onto said outer base member,
   said backing member having a greater depth than said side-by-side outlet spacing between said passageways (14) and said outer base member to form a continuous unobstructed outlet through which the peas exit, 'a tubular member 26 disposed across a length of said side-by-side passageways with a portion of said tubular member extending above said side-by-side passageways to function as a bumper to assist in forcing the shelled peas into the side-by-side passageways, and
   end members (16, 18) disposed outwardly of said side-by-side passageways and which are secured to said outer base member to secure said improved separator outlet member to end closure members of said pea sheller.

9. An improved separator outlet member as set forth in claim 8, wherein said elongated outlet member and said end members are formed as one integral piece.

10. An improved separator outlet member as set forth in claim 9, in which said elongated outlet member has two rows of side-by-side passages, and said backing portion, said side-by-side passages, and said end members are all formed of one integral piece of material.

11. An improved separator outlet member as set forth in claim 8, in which said elongated outer base member has beveled edges along its length which aids in assembly of a plurality of side-by-side separator outlet members to form a substantially cylindrical outer surface of a pea sheller drum.

12. An improved separator outlet member as set forth in claim 9, in which a tubular member (26) across the length of said side-by-side passageways with a portion of said tubular member extending above said side-by-side passageways which functions as a bumper to assist in forcing the shelled peas into the side-by-side passageways.

13. An improved separator outlet member as set forth in claim 10, in which a tubular member (26) is disposed across the length of said side-by-side passageways with a portion of said tubular member extending above said side-by-side passageways to function as a bumper to assist in forcing the shelled peas into the side-by-side passageways.

14. An improved separator outlet member as set forth in claim 11, in which a tubular member (26) is disposed across the length of said side-by-side passageways with a portion of said tubular member extending above said side-by-side passageways to function as a bumper to assist in forcing the shelled peas into the side-by side passageways.

* * * * *